United States Patent [19]
Courter et al.

[11] Patent Number: 6,119,128
[45] Date of Patent: Sep. 12, 2000

[54] RECOVERING DIFFERENT TYPES OF OBJECTS WITH ONE PASS OF THE LOG

[75] Inventors: Daniel Keith Courter, Antioch; Ming-Hung Hu, San Jose; Laura Michiko Kunioka-Weis, Morgan Hill; Thomas Majithia; Deborah A. Matamoros, both of San Jose; James Alan Ruddy, Gilroy; Yufen Wang, Saratoga, all of Calif.

[73] Assignee: International Business Machines Corporation, Armonk, N.Y.

[21] Appl. No.: 09/050,554

[22] Filed: Mar. 30, 1998

[51] Int. Cl.[7] ................................................ G06F 12/00
[52] U.S. Cl. ..................... 707/202; 707/200; 707/201; 707/203; 707/204; 707/205
[58] Field of Search ..................... 707/200, 201, 707/202, 203, 204, 205

[56] References Cited

U.S. PATENT DOCUMENTS

| | | | |
|---|---|---|---|
| 4,945,474 | 7/1990 | Elliott et al. | 714/16 |
| 5,276,872 | 1/1994 | Lomet et al. | 707/202 |
| 5,278,982 | 1/1994 | Daniels et al. | 707/202 |
| 5,280,611 | 1/1994 | Mohan et al. | 707/8 |
| 5,327,532 | 7/1994 | Ainsworth et al. | 709/248 |
| 5,333,303 | 7/1994 | Mohan | 714/20 |
| 5,455,944 | 10/1995 | Haderle et al. | 707/202 |
| 5,455,946 | 10/1995 | Mohan et al. | 707/202 |
| 5,561,795 | 10/1996 | Sarkar | 707/202 |
| 5,561,798 | 10/1996 | Haderle et al. | 707/202 |
| 5,574,897 | 11/1996 | Hermsmeier et al. | 707/1 |
| 5,581,750 | 12/1996 | Haderle et al. | 707/202 |
| 5,625,820 | 4/1997 | Hermsmeier et al. | 707/202 |
| 5,721,918 | 2/1998 | Nilsoson | 707/202 |
| 5,832,508 | 11/1998 | Sheman | 707/200 |
| 5,873,096 | 2/1999 | Lim | 707/201 |
| 5,903,898 | 5/1999 | Cohen | 707/204 |
| 5,907,848 | 5/1999 | Zaiken | 707/202 |
| 5,920,873 | 7/1999 | Van Huben | 707/202 |
| 5,926,816 | 7/1999 | Bauer | 707/8 |

OTHER PUBLICATIONS

"Incremental Data Base Log Image Copy", IBM Technical Disclosure Bulletin, vol. 25, No. 7B, pp. 3730–3732, 1982.

"Technique For Data Recovery excluding Portions of The Log Without Requiring a Full Image Copy", IBM Technical Disclosure Bulletin, vol. 36, No. 11, pp. 359–360, Nov. 1993.

Fernando de Ferreira Rezende, et al., "Employing Object–Based LSNs in A Recovery Strategy", Database And Expert Systems Applications, 7th International Conference, DEXA '96, pp. 116–129, Sep. 9–13, 1996.

Primary Examiner—Thomas G. Black
Assistant Examiner—Diane D. Mizrahi
Attorney, Agent, or Firm—Pretty, Schroeder & Poplawski

[57] ABSTRACT

A method, apparatus, and article of manufacture for a computer implemented recovery system for restoring a database in a computer. The database contains objects and is stored on a primary data storage device connected to the computer. Objects of different types in the database are copied from the primary data storage device to a secondary data storage device. Modifications to the objects are logged in a log file. A recovery indicator is received that indicates that recovery of the objects in the database is required. The objects are copied from the secondary data storage device to the database on the primary data storage device. Modifications in the log file are applied to the copied objects during one pass through the log file.

24 Claims, 6 Drawing Sheets

RECOVERING DIFFERENT TYPES OF OBJECTS WITH ONE PASS OF THE LOG

BACKGROUND OF THE INVENTION

1. Field of the Invention

This invention relates in general to computer-implemented database systems, and, in particular, to recovering different types of objects with one pass of the log.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on direct access storage devices (DASD), such as magnetic or optical disk drives for semipermanent storage.

A table is assigned to a tablespace. The tablespace contains one or more datasets. In this way, the data from a table is assigned to physical storage on DASD. Each tablespace is physically divided into equal units called pages. The size of the tablespace's pages is based on the page size of the bufferpool specified in the tablespace's creation statement. The bufferpool is an area of virtual storage that is used to store data temporarily. A tablespace can be partitioned, in which case a table may be divided among the tablespace's partitions, with each partition stored as a separate dataset. Partitions are typically used for very large tables.

A table may have an index. An index is an ordered set of pointers to the data in the table. There is one physical order to the rows in a table that is determined by the RDBMS software, and not by a user. Therefore, it may be difficult to locate a particular row in a table by scanning the table. A user creates an index on a table, and the index is based on one or more columns of the table. A partitioned table must have at least one index. The index is called the partitioning index and is used to define the scope of each partition and thereby assign rows of the table to their respective partitions. The partitioning indexes are created in addition to, rather than in place of, a table index. An index may be created as UNIQUE so that two rows can not be inserted into a table if doing so would result in two of the same index values. Also, an index may be created as a CLUSTERING index, in which case the index physically stores the rows in order according to the values in the columns specified as the clustering index (i.e., ascending or descending, as specified by the user).

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data. As the data is being modified, all operations on the data are logged in a log file.

Typically, the database containing partitions and indexes is stored on a data storage device, called a primary data storage device. The partitions are periodically copied to another data storage device, called a secondary data storage device, for recovery purposes. In particular, the partitions stored on the primary data storage device may be corrupted, for example, due to a system failure during a flood, or a user may want to remove modifications to the data (i.e., back out the changes). In either case, for recovery, the partitions are typically copied from the secondary data storage device to the primary data storage device. Next, using the log file, the copied data is modified based on the operations in the log file. Then, the indexes are rebuilt. In particular, to rebuild the indexes, keys are copied from each row of each partition, sorted, and then used to create a partitioning index. Additionally, the table index is rebuilt via the same technique.

This technique for recovery of data and indexes is very costly in terms of performance. Additionally, users are not able to access data while recovery is taking place. For a user or company requiring the use of computers to do business, much money can be lost during recovery. Therefore, it is important to improve the efficiency of the recovery process, and there is a need in the art for an improved recovery technique.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented recovery system for restoring a database in a computer.

In accordance with the present invention, the database contains objects and is stored on a primary data storage device connected to the computer. Objects of different types in the database are copied from the primary data storage device to a secondary data storage device. Modifications to the objects are logged in a log file. A recovery indicator is received that indicates that recovery of the objects in the database is required. The objects are copied from the secondary data storage device to the database on the primary data storage device. Modifications in the log file are applied to the copied objects during one pass through the log file.

An object of the invention is to provide an improved recovery system for a database. Another object of the invention is to provide recovery for partitions, partitioning indexes, and table indexes simultaneously. Yet another object of the invention is to provide a recovery system for a database that requires only one pass of a log file to apply modifications to the database.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
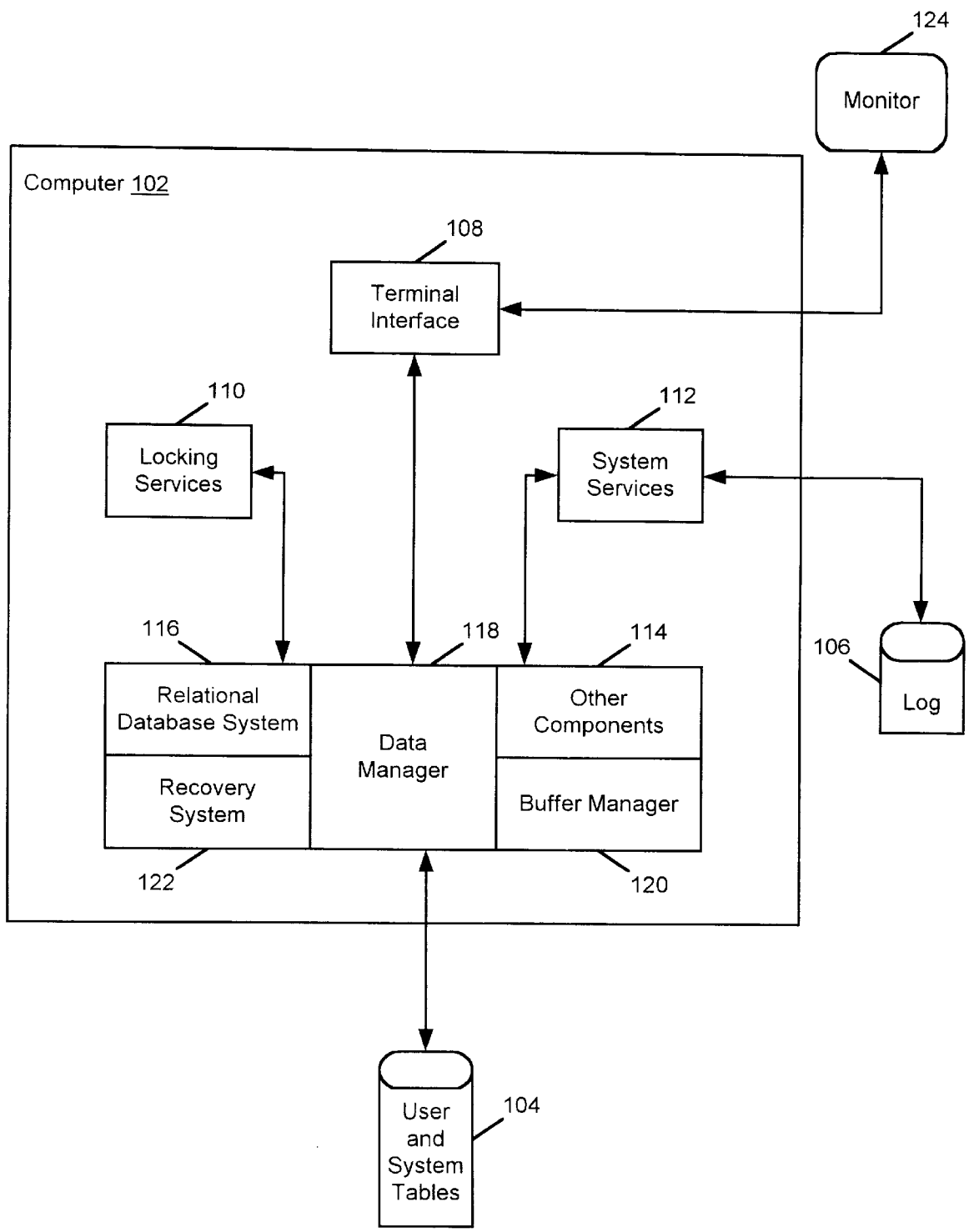
FIG. 1 illustrates an exemplary computer hardware environment that could be used in accordance with the present invention.

FIG. 1 illustrates an exemplary computer hardware environment that could be used in accordance with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC®, CICS®, TSO®, OS/390® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2® product offered by IBM for the MVS® or OS/390® operating systems. Those skilled in the art will recognize, however, that the present invention has application program to any RDBMS software that uses SQL.

As illustrated in FIG. 1, the DB2® architecture for the MVS® operating system includes three major components: the Internal Resource Lock Manager (IRLM) 110, the Systems Services module 112, and the Database Services module 1 14. The IRLM 110 handles locking services for the DB2® architecture, which treats data as a shared resource, thereby allowing any number of users to access the same data simultaneously. Thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® architecture is the Database Services module 114. The Database Services module 114 contains several submodules, including the Relational Database System (RDS) 116, the Data Manager 118, the Buffer Manager 120, the Recovery System 122, and other components 124, such as an SQL compiler/interpreter. These submodules support the functions of the SQL language, i.e. definition, access control, interpretation, compilation, database retrieval, and update of user and system data. The Recovery System 122 works with the components of the computer system 102 to restore a database.

The present invention is generally implemented using SQL statements executed under the control of the Database Services module 114. The Database Services module 114 retrieves or receives the SQL statements, wherein the SQL statements are generally stored in a text file on the data storage devices 104 and 106 or are interactively entered into the computer system 102 by an operator sitting at a monitor 124 via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104 and 106. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 and 106 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Recovering Different Types of Objects With One Pass of The Log

The present invention provides a recovery system 122 for recovering different types of objects using only one pass through a log file. In particular, table partitions of a database, along with indexes (e.g., partitioning indexes and table indexes), are copied to one or more data storage devices, such as magnetic tape. The database may be stored on a primary data storage device, while the copies of the database partitions and indexes are stored on a secondary data storage device. The primary and secondary data storage devices could be the same or different devices.

Then, as modifications are made to the data in the table partitions, the modifications are logged in a log file. If recovery of the table partitions and partitioning indexes are required, the recovery system 122 of the present invention copies the table partitions and partitioning indexes from the secondary data storage device back to the database. Then, the recovery system 122 modifies both the table partitions and the partitioning indexes while making one pass through the log file. That is, the recovery system 122 extracts all of the pertinent log records containing updates to all of the objects being recovered in a single read pass of logged changes.

The recovery system 122 allows for independent recovery of the data and indexes, and a significant decrease in elapsed time since the log file updates are done for all objects in the database with one pass through the log file.

Figure 2:
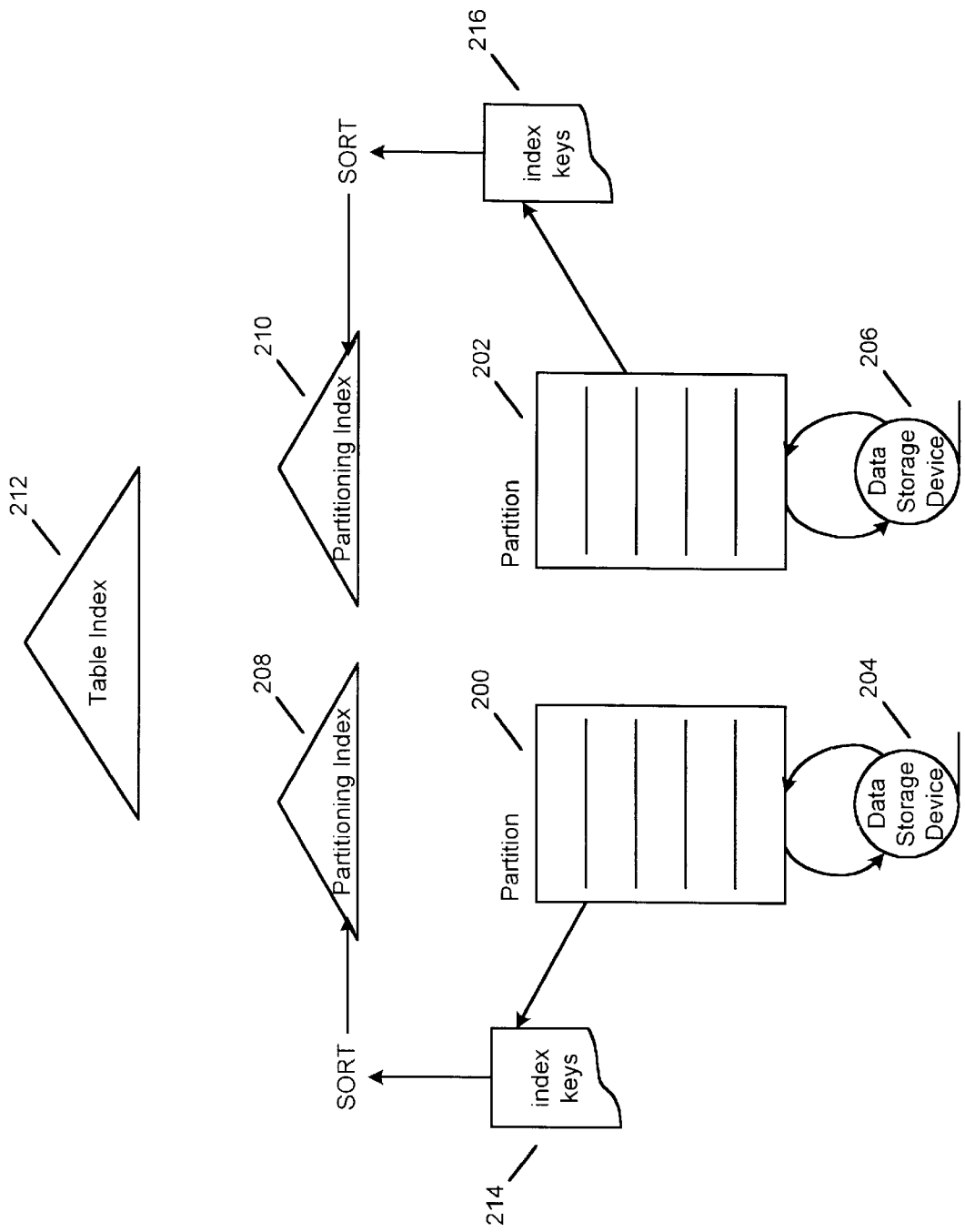
FIG. 2 illustrates a conventional system for recovery of a database.

FIG. 2 illustrates a conventional system for recovery of a database. In a conventional system, partitions 200 and 202 of a database are copied from primary data storage devices to secondary data storage devices 204 and 206. In a conventional system, the partitioning indexes 208 and 210 and the table index 212 are not stored on secondary data storage devices. Then, when recovery is required, the conventional system copies the partitions 200 and 202 from the secondary data storage devices 204 and 206 to the database on the primary data storage devices. The conventional system applies modifications logged in a log file to the copied partitions. Then, the conventional system reads each row of each partition 200 and 202 and retrieves index keys 214 and 216 for each row of each partition 200 and 202. The index keys 214 and 216 are sorted and are used to rebuild indexes 208 and 210, respectively. Table index 212 is rebuilt in the same manner. This procedure has a high performance cost.

Figure 3:
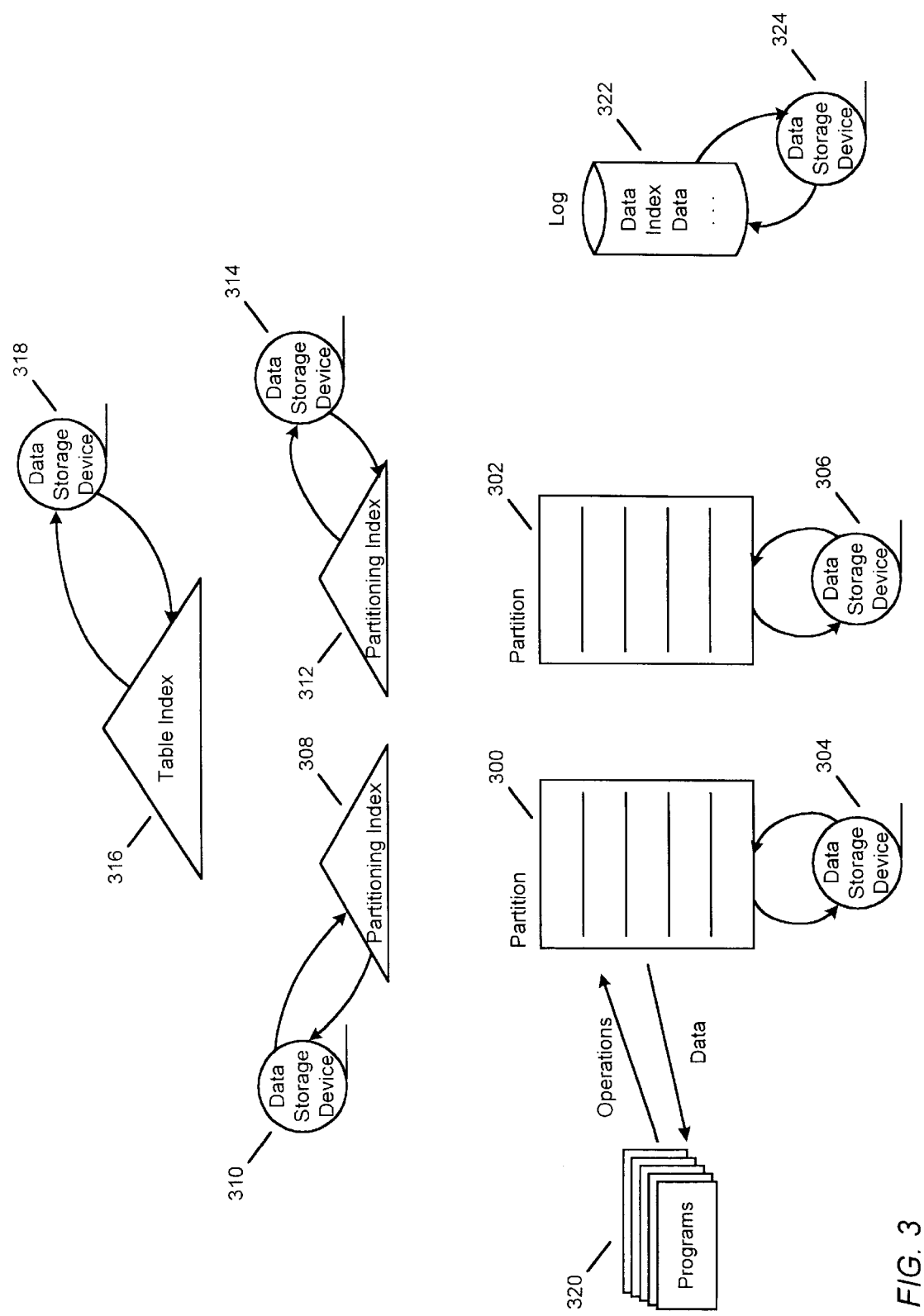
FIG. 3 illustrates the recovery system in accordance with the present invention.

FIG. 3 illustrates the recovery system 122 in accordance with the present invention. Initially, the partitions 300 and 302 are copied to secondary data storage devices 304 and 306. Also, partitioning indexes 308 and 312 are copied to secondary data storage devices 310 and 314. The table index 316 is also copied to a secondary data storage device 318. Then, as application programs 320 modify the database by adding, updating, or deleting data via operations, the modifications are logged in the log file 322. The log file may be copied to a secondary data storage device 324 if the log file on the primary storage device becomes full. The log file 322 contains information identifying modifications to both the partitions and indexes.

For recovery, the partitions from the data storage devices 304 and 306 are copied back to the primary data storage device. The partitioning indexes are copied from the secondary data storage devices 310 and 314 to the primary data storage device. Additionally, the table index is copied from the secondary data storage device 318 to the primary data storage device. Then, the log records subsequent to the last copying from the primary to the secondary data storage devices are applied to the partitions and indexes. In particular, while reading the log file through once, the recovery system 122 modifies both the partitions 300 and 302 and the indexes 308, 312, and 316.

Figure 4:
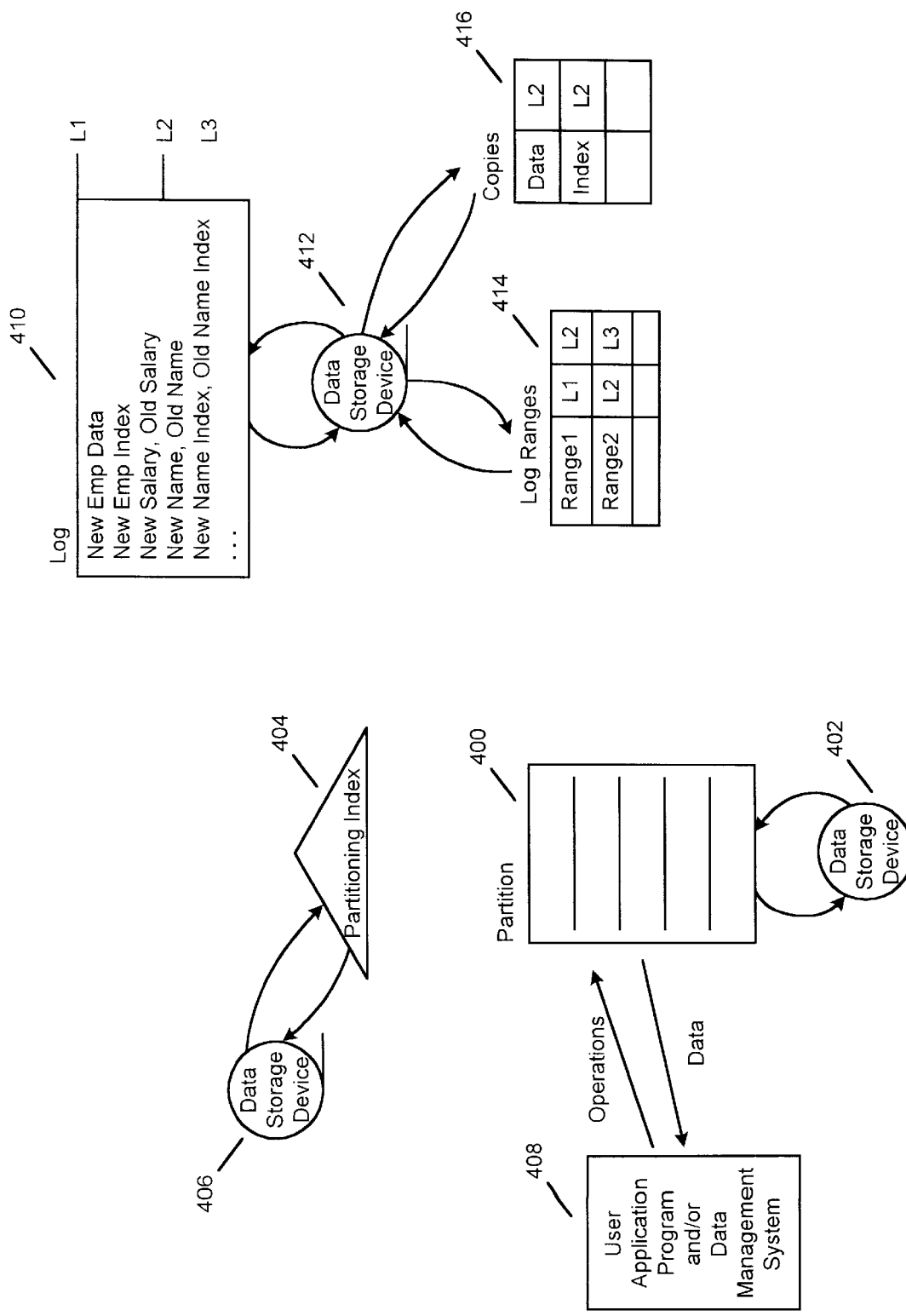
FIG. 4 provides an example that illustrates the recovery system in accordance with the present invention.

FIG. 4 provides an example that illustrates the recovery system 122 in accordance with the present invention. Initially, the partition 400 is copied to a secondary data storage device 402, and the partitioning index 404 is copied to a secondary data storage device 406. Then, a user application program and/or a data management system 408 perform operations on the data in the partition 400 and partitioning index 404. The operations are logged in the log file 410.

For example, if the first operation adds a new employee, the recovery system 122 modifies the partition 400 and the partitioning index 404. In particular, the recovery system 122 adds entries to the log file for "New Emp Data" and "New Emp Index". Then, if an operation updates salary information for an employee, the recovery system 122 modifies the partition 400. The log file then contains an entry for "New Salary, Old Salary" that identifies the salary before and after modification. Next, if the partition 400 and partitioning index 404 are to be copied, a log range file 414 and a copies file 416 are modified. In particular, the log file 410 is separated into ranges. The log range file 414 indicates each of the ranges, for example, that Range1 goes from range identifier L1 to range identifier L2. The copies file 416 indicates partitions and indexes that have been copied. The range identifier, for example, L2, indicates that the copied data for the partitions and indexes includes all of the operations logged up to range identifier L2.

Next, if the name of an employee is changed, the partition 400 and partitioning index 404 are modified. Then, the log file 410 contains an entry for "New Name, Old Name" that provides the new and old name of the employee whose name changed and an entry for "New Name Index, Old Name Index" that provides the index modification. Next, assuming that there is a loss of data, recovery of the data is required. Initially, the partition 400 and the partitioning index 404 are copied from secondary data storage devices back to the primary data storage device. Since, according to the copies file 416, these copies include all modifications up to range identifier L2, only operations after range identifier L2 are applied to the partition 400 and the partitioning index 404 to recover the database. Moreover, during one pass through the log file, the recovery system 122 identifies the required modifications and applies them to the partition 400 and the partitioning index 404.

Figure 5:
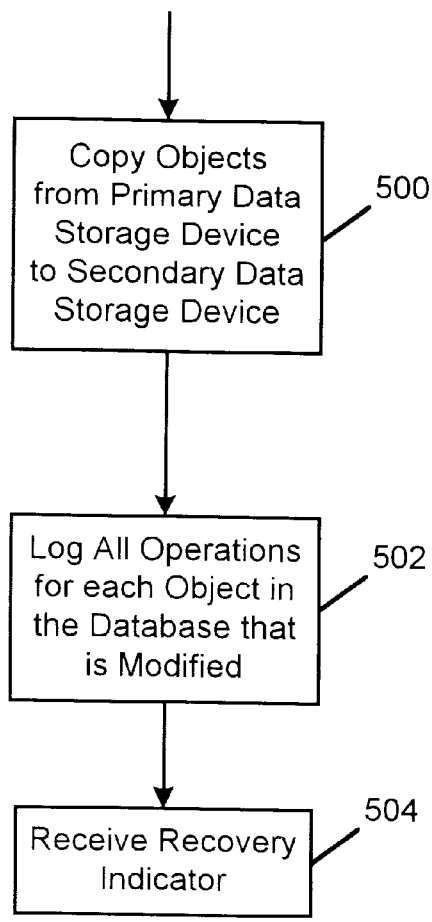
FIG. 5 is a flow diagram illustrating the steps performed by the recovery system prior to recovery of a database in accordance with the present invention.

FIG. 5 is a flow diagram illustrating the steps performed by the recovery system 122 prior to recovery of a database in accordance with the present invention. In Block 500, the recovery system 122 copies objects from a primary data storage device to a secondary data storage device. In Block 502, the recovery system 122 logs all operations for each object in the database that is modified. In Block 504, the recovery system 122 receives a recovery indicator.

Figure 6:
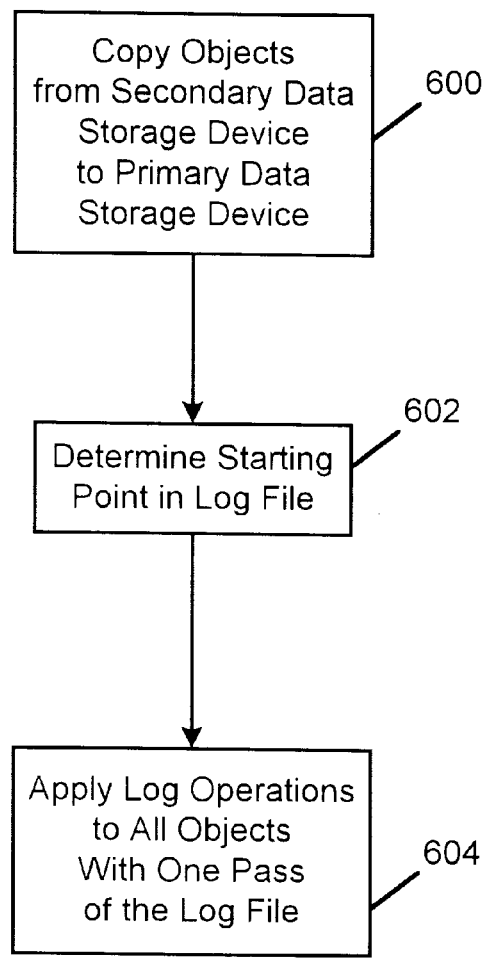
FIG. 6 is a flow diagram illustrating the steps performed by the recovery system to recover a database in accordance with the present invention.

FIG. 6 is a flow diagram illustrating the steps performed by the recovery system 122 to recover a database in accordance with the present invention. In Block 600, the recovery system 122 copies objects from the secondary data storage device to the primary data storage device. That is, each of the objects is replaced by an image copy taken at a previous time. The individual objects may be restored from the image copies concurrently with each other. In Block 602, the recovery system 122 determines the point in the log at which to start applying operations. In Block 604, the recovery system 122 applies log operations to all objects through one pass of the log file.

That is, beginning at the determined starting point, the recovery system 122 reads the log file and extracts the changes for each individual object. The recovery system 122 applies the changes to the specified elements within the object. The changes to an individual object may be applied concurrently with changes being applied to the other objects involved in the recovery. This continues until all the required changes have been applied to all the specified objects.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a computer-implemented recovery system. The present invention provides an improved recovery system for a database. Additionally, the present invention provides recovery for partitions and partitioning indexes simultaneously. Moreover, the present invention provides a recovery system for a database that requires only one pass of a log file to apply modifications to the database.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of restoring a database in a computer, the database containing objects and being stored on a primary data storage device connected to the computer, the method comprising the steps of:
   copying objects of different types in the database from the primary data storage device to a secondary data storage device, wherein one of the objects is a table index for locating data in a table, and wherein one of the objects is a partitioning index for defining a scope of each partition and thereby assigning a row of the table to its respective partition;
   logging modifications to the objects, including the table index and the partitioning index, in a log file;
   receiving a recovery indicator indicating that recovery of the objects in the database is required;
   copying the objects, including the table index and the partitioning index, from the secondary data storage device to the database on the primary data storage device; and
   applying the modifications in the log file to the copied objects, including the table index and the partitioning index, during one pass through the log file.

2. The method of claim 1, wherein the types of the objects include table data.

3. The method of claim 1, wherein the types of the objects include partition indexes.

4. The method of claim 1, wherein the recovery indicator indicates that modifications to the objects are to be reversed.

5. The method of claim 1, wherein the recovery indicator indicates that the objects have been corrupted.

6. The method of claim 1, further comprising the step of maintaining log ranges.

7. The method of claim 1, further comprising the step of maintaining copy information for objects that are copied.

8. The method of claim 7, further comprising the step of determining a starting point in the log file based on the copy information.

9. An apparatus for restoring a database in a computer, comprising:
   a computer having a primary data storage device connected thereto, wherein the primary data storage device stores a database containing objects;
   one or more computer programs, performed by the computer, for copying objects of different types in the database from the primary data storage device to a secondary data storage device, wherein one of the objects is a table index for locating data in a table, and wherein one of the objects is a partitioning index for defining a scope of each partition and thereby assigning a row of the table to its respective partition, logging modifications to the objects, including the table index and the partitioning index, in a log file, receiving a recovery indicator indicating that recovery of the objects in the database is required, copying the objects, including the table index and the partitioning index, from the secondary data storage device to the database on the primary data storage device, and applying the modifications in the log file to the copied objects, including the table index and the partitioning index, during one pass through the log file.

10. The apparatus of claim 9, wherein the types of the objects include table data.

11. The apparatus of claim 9, wherein the types of the objects include partition indexes.

12. The apparatus of claim 9, wherein the recovery indicator indicates that modifications to the objects are to be reversed.

13. The apparatus of claim 9, wherein the recovery indicator indicates that the objects have been corrupted.

14. The apparatus of claim 9, further comprising the means for maintaining log ranges.

15. The apparatus of claim 9, further comprising the means for maintaining copy information for objects that are copied.

16. The apparatus of claim 15, further comprising the means for determining a starting point in the log file based on the copy information.

17. An article of manufacture comprising a computer program carrier readable by a computer and embodying one or more instructions executable by the computer to perform method steps for restoring a database, the database containing objects and being stored on a primary data storage device connected to the computer, the method comprising the steps of:
   copying objects of different types in the database from the primary data storage device to a secondary data storage device, wherein one of the objects is a table index for locating data in a table, and wherein one of the objects is a partitioning index for defining a scope of each partition and thereby assigning a row of the table to its respective partition;
   logging modifications to the objects, including the table index and the partitioning index, in a log file;
   receiving a recovery indicator indicating that recovery of the objects in the database is required;
   copying the objects, including the table index and the partitioning index, from the secondary data storage device to the database on the primary data storage device; and
   applying the modifications in the log file to the copied objects, including the table index and the partitioning index, during one pass through the log file.

18. The method of claim 17, wherein the types of the objects include table data.

19. The method of claim 17, wherein the types of the objects include partition indexes.

20. The method of claim 17, wherein the recovery indicator indicates that modifications to the objects are to be reversed.

21. The method of claim 17, wherein the recovery indicator indicates that the objects have been corrupted.

22. The method of claim 17, further comprising the step of maintaining log ranges.

23. The method of claim 17, further comprising the step of maintaining copy information for objects that are copied.

24. The method of claim 23, further comprising the step of determining a starting point in the log file based on the copy information.

* * * * *